United States Patent [19]

Minoura et al.

[11] Patent Number: 4,949,064
[45] Date of Patent: Aug. 14, 1990

[54] NON-LINEAR RESISTOR HAVING A POLY (AMINO ACID) MEMBRANE

[75] Inventors: Norihiko Minoura; Kei Urabe; Seiichi Aiba; Kazuhiro Taguchi; Yukihiko Fujiwara, all of Tsukuba, Japan

[73] Assignee: Japan as represented by Director General of Agency of Industrial Science and Technology, Tokyo, Japan

[21] Appl. No.: 313,079

[22] Filed: Feb. 21, 1989

[30] Foreign Application Priority Data

May 2, 1988 [JP] Japan .................. 63-109749

[51] Int. Cl.$^5$ ............................................. H01C 10/02
[52] U.S. Cl. ............................. 338/80; 338/81; 338/82
[58] Field of Search ................ 338/80, 81, 82, 83, 338/84, 85, 86; 427/12

[56] References Cited

U.S. PATENT DOCUMENTS 4,391,841  7/1983  Zeblisky ................... 427/12

Primary Examiner—Bruce A. Reynolds
Assistant Examiner—M.M. Lateef
Attorney, Agent, or Firm—Wyatt, Gerber, Burke & Badie

[57] ABSTRACT

A membrane of an ionic pendant-containing, water-insoluble copolymeric poly(amino acid) composed of a first moiety derived from a first amino acid which gives a water-soluble poly (amino acid) with ionic groups of carboxyl and/or amino groups as the pendants to the molecule, e.g., glutamic acid, aspartic acid, lysine and ornithine, and a second moiety derived from a second amino acid which gives a water-insoluble poly (amino acid), e.g., leucine, alanine and methionine, in a specified molar proportion serves as a functional element of an electronic device such as a non-linear resistor capable of working in an aqueous medium and exhibiting a non-linear voltage-current relationship or a phenomenon of hysteresis in the voltage/current scanning.

11 Claims, 3 Drawing Sheets

NON-LINEAR RESISTOR HAVING A POLY (AMINO ACID) MEMBRANE

BACKGROUND OF THE INVENTION

The present invention relates to a novel electronic device or, more particularly, to an electronic device having a membrane of a specific polymeric material as the functional element which behaves as a non-linear resistor.

Most of conventional electronic devices are built with an inorganic material for the functional element which unavoidably is affected by water or moisture so that the devices fail to work in water. Further, most of conventional resistors behave as a linear resistance element of which the electric current passing therethrough is proportional to the voltage applied between the electrodes there of. On the other hand, it is desired in the art to develop a non-linear resistance element of which the resistance depends on the electric current or applied voltage or depends on the scanning velocity of the electric current or applied voltage and the current-voltage curve exhibits a phenomenon of hysteresis. In recent years, furthermore, it is desired to develop biocomputers and biosensors on the base of the rapidly progressing researches for molecular devices and biochemical devices working in a mechanism quite different from that of conventional electronic devices.

SUMMARY OF THE INVENTION

The present invention accordingly has an object to provide an electronic device with a functional element formed of a unique organic or polymeric material to meet the above mentioned requirements in the art of electronics.

Thus, the electronic device of the invention comprises a polymeric membrane made of a poly(amino acid) having ionic groups as the pendants to the main chain of the molecule and insoluble in water as a whole.

The above defined electronic device serves as a non-linear resistor comprising the polymeric membrane, two electrolyte-containing media each contacting with one of the surfaces of the polymeric membrane and at least two electrodes each in contact with one of the electrolyte-containing media.

DETAILED DESCRIPTION OF THE PREFERRED EMBODIMENTS

Figure 1:
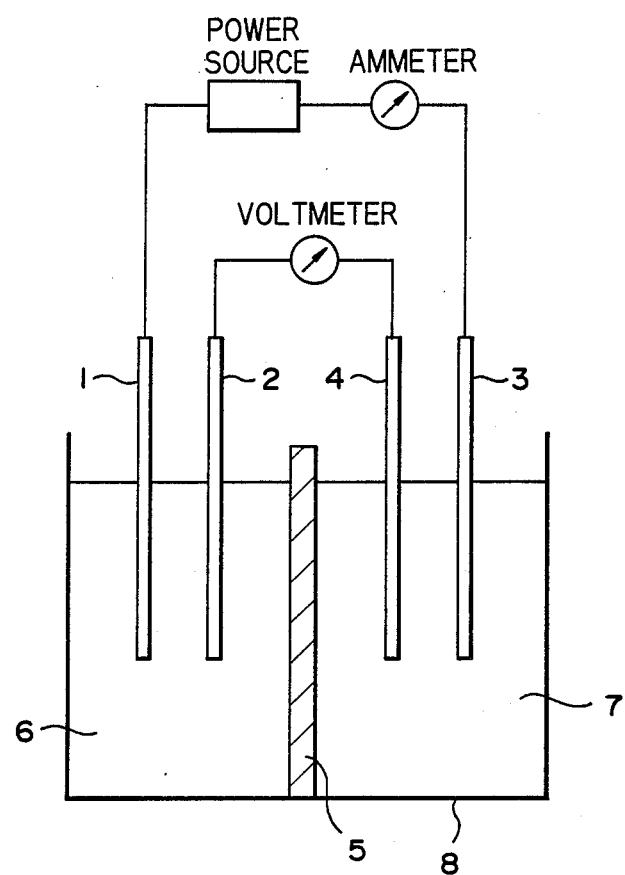
FIG. 1 is a schematic cross sectional illustration of a non-linear resistor device according to the invention.

In view of the above described desire in the electronic industries, the inventors have continued extensive investigations with an object to develop a novel organic electronic material and have arrived at a discovery that membranes formed of a poly(amino acid) behave quite uniquely to provide a novel electronic device with the same as a functional element.

The poly(amino acid) as the material of the membrane working as a functional element of the inventive device has ionic groups as the pendants to the main chain of the molecule and insoluble in water as a whole. The ionic group here implied is a carboxyl group —COOH or an amino group —$NH_2$ though not limited thereto. Examples of the amino acids from which the poly(amino acid) useful in the invention include glutamic acid, aspartic acid, lysine, ornithine and the like characterized by the ionic groups in the pendant to the molecule of an amino acid. The pendant to the molecule of an amino acid ;s defined by the symbol R in a general formula $H_2$—H—CHR—COOH representing an amino acid. It should be noted that poly(amino acids) prepared from these ionic pendant-containing amino acids alone are generally soluble in water while it is essential in the invention that the membrane of the poly(amino acid) is insoluble in water as a whole. The water-insolubility as a whole here implied means that the polymer is composed of an inherently water soluble moiety and an inherently water-insoluble moiety but the polymer per se is insoluble in water. In view of the fact that the above named ionic pendant-containing amino acid forms an inherently water-insoluble moiety in the polymer, such a poly(amino acid) insoluble in water as a whole can be prepared by the copolymerization of the above named ionic pendant-containing amino acid with another amino acid having no ionic group as the pendant in the molecule such as leucine, alanine, methionine and the like. In order that the poly(amino acid) is insoluble in water as a whole, the polymer is composed preferably of 5 to 45% by moles of the inherently water-soluble moiety and 95 to 55% by moles of the inherently water-insoluble moiety. The type of the copolymer may be a random copolymer or block copolymer. Random copolymerization of amino acids is performed by dissolving the N-carboxyanhydrides of a first and second amino acids in an organic solvent together with an amine compound or a similar catalytically active compound as the polymerization initiator. Membranes of a poly(amino acid) can be prepared according to a known method such as casting of a solution of the polymer on a glass plate followed by drying and peeling of the dried film off the glass plate. Membranes having a thickness of 1 to 100 μm are suitable for the purpose of the invention.

When an electronic device such as a non-linear resistor of the invention is constructed using the membrane of the specific poly(amino acid), the membrane is contacted with an electrolyte-containing medium on each of the surfaces. The electrolyte containing medium here implied is typically an aqueous solution of a salt of an organic or inorganic acid such as potassium chloride, sodium chloride, lithium chloride, calcium chloride, sodium acetate and the like in a concentration of, for example, $10^{-4}$ to $10^{-1}$ mole/liter. The electrolyte-containing medium also can be a hydrous gelled material containing these salts dissolved therein.

A typical model of such a device is illustrated schematically in FIG. 1 in which the vessel 8 is partitioned with the membrane 5 of the poly(amino acid) into two compartments 6 and 7 and each compartment is filled with an aqueous salt solution. Two sets of electrodes 1,2 and 3,4 are inserted each into the salt solution in the compartments 6, 7, respectively, to form two electrode pairs of the electrodes 1,3 and 2,4. Various types of electrodes can be used for this purpose and any of the electrodes conventionally used in the electrochemical measurements is suitable including, for example, Ag/AgCl electrodes and caromel electrodes though not particularly limited thereto provided that the material of the electrode is inert to the salt solution. It is important that the electrodes forming a pair, e.g., the electrodes 1 and 3 or 2 and 4, are of the same type. In the assembly illustrated in FIG. 1, the electrode pair 1,3 serves for passing electric current through the salt solutions in the compartments 6,7 partitioned by the membrane 5 while the other electrode pair 2,4 serves for voltage measurement between the salt solutions in the compartments 6,7.

Figure 2:
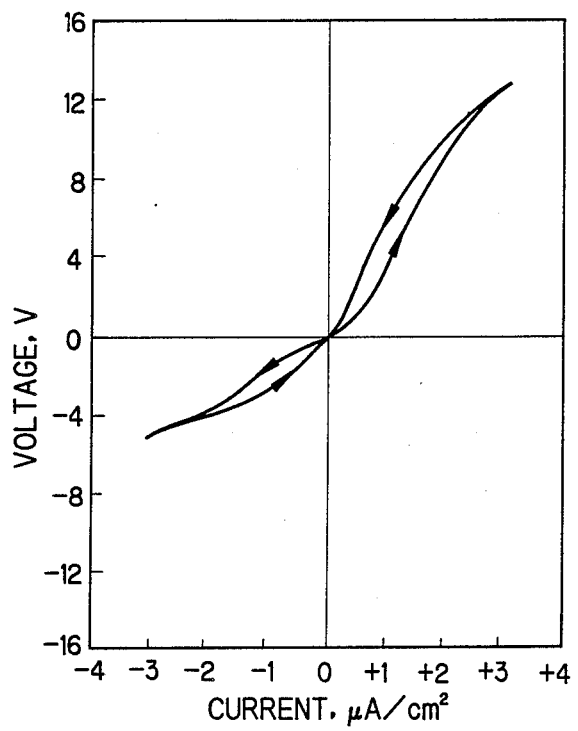
FIGS. 2 to 5 are each a graph showing the current vs. voltage relationship obtained with the device shown in FIG. 1.

FIG. 2 is a graph showing the relationship between the electric current and voltage obtained in the above described manner by scanning the current from $-3$ $\mu A/cm^2$ to $+3$ $\mu A/cm^2$. As is shown in this graph, the current vs. voltage curve has a hysteresis loop in each direction of the current indicating that the resistance of the membrane depends on the electric current passing therethrough. This is the reason that a non-linear resistor is obtained with a membrane of the specific poly(amino acid) as a functional element.

In the following, the present invention is described in more detail by way of examples.

PREPARATION EXAMPLE

According to the disclosure in Macromolecules, volume 10, No. 2, pages 346–351 (1977), a tri-block copolymer of benzyl glutamate-leucine-benzyl glutamate was prepared in the following manner. Thus, N carboxyanhydride of L-leucine was dissolved in a 19:1 mixture of benzene and dioxane together with 1,6-hexamethylene diamine as a polymerization initiator. The amount of the 1,6-hexamethylene diamine was 1/66 by moles based on the N-carboxyanhydride of L-leucine to effect the polymerization reaction at 20° C. Carbon dioxide gas was evolved as the reaction proceeded so that the reaction could be monitored by measuring the volume of the evolved carbon dioxide gas. When evolution of carbon dioxide gas had ceased after 5 days indicating completion of the reaction, N-carboxyanhydride of γ-benzyl L-glutamate dissolved in the same solvent mixture as above was added to the reaction mixture to further continue the polymerization reaction for 15 days. The overall concentration of the N-carboxyanhydrides of amino acids was 20 g/liter. After completion of the reaction, the reaction mixture was poured into a large volume of methyl alcohol and the precipitates were collected by filtration, thoroughly washed with methyl alcohol and dried under reduced pressure. The precipitates were dissolved in a 9:1 mixture of chloroform and trifluo roacetic acid and reprecipitated by pouring the solution into a large volume of a 9:1 mixture of chloroform and ether so as to be freed from homopolymers of the amino acids.

The block copolymer after purification in the above described manner was dissolved in benzene and the solution was cast and spread over a glass plate followed by drying by evaporation of benzene to give a film of the block copolymer of benzyl glutamate-leucine benzyl glutamate having a thickness of 0.02 mm. The copolymer was composed of 36% by moles of the benzyl glutamate moiety and 64% by moles of the leucine moiety.

The above prepared film was then subjected to a reaction of hydrolysis in order to convert the benzyl ester groups into free carboxyl groups according to the disclosure in Journal of Applied Polymer Science, volume 31, pages 1935–1942 (1986) by dipping the film in a 2:2:1 by volume mixture of isopropyl alcohol, methyl alcohol and 5N aqueous solution of sodium hydroxide for 20 days at 18° C. followed by thorough rinsing first in ethyl alcohol and then in water. The resultant film could be identified to be a film of a block copolymer of glutamic acid-leucine-glutamic acid from the disappearance of the absorption band assignable to the ester linkages at a wave number of 1730 cm in the infrared absorption spectrum.

EXAMPLE 1

The above prepared film of a poly(amino acid) block copolymer was set as a partitioning membrane between two compartments of an acrylic resin-made vessel and each compartment was filled with 250 ml of a 1 mM aqueous solution of potassium chloride having a pH of 5.8. A combination of an Ag/AgCl electrode and a caromel electrode was inserted into the salt solution in each of the compartments. The two Ag/AgCl electrodes were connected through a power source and an ammeter and the two caromel electrodes were connected through a voltmeter. The current was repeatedly increased and decreased between $-3$ $\mu A/cm^2$ and $+3$ $\mu A/cm^2$ at such a rate that the scanning velocity of the impressed voltage was 0.1 V/second in the power source shown in FIG. 1 to record the current vs. voltage relationship graphically shown in FIG. 2 from which it is clear that the current vs. voltage curve exhibited a phenomenon of hysteresis and that the resistance of the membrane was variable depending on the current.

EXAMPLE 2

Figure 3:
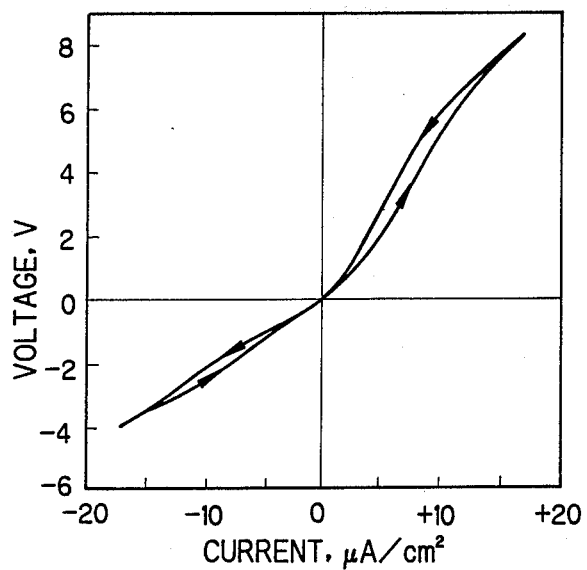

The experimental procedure was substantially the same as in Example 1 except that the concentration of the aqueous solution of potassium chloride filling the compartments of the cell was increased from 1 mM to 10 mM. The current vs. voltage relationship obtained by the measurement is graphically shown in FIG. 3 from which it is clear that the current vs. voltage curve exhibited a phenomenon of hysteresis and that the resistance of the membrane was variable depending on the current.

EXAMPLE 3

Figure 4:
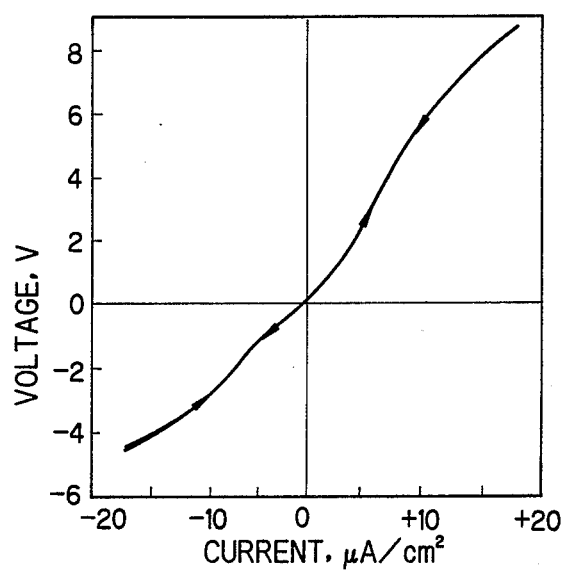

The experimental procedure was substantially the same as in Example 2 except that the scanning velocity of the impressed voltage in the power source was decreased from 0.1 V/second to 0.002 V/second. The current vs. voltage relationship obtained by the measurement is graphically shown in FIG. 4 from which it is clear that the resistance of the membrane was variable depending on the current although the phenomenon of hysteresis was not noted in this case.

EXAMPLE 4

Figure 5:
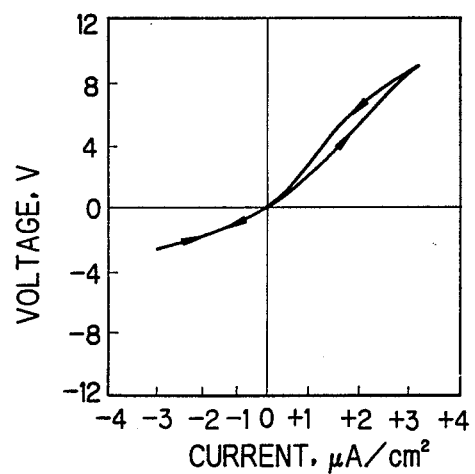

The experimental procedure was substantially the same as in Example 1 except that the pH of the aqueous solution of potassium chloride was 4.0 instead of 5.8. The current vs. voltage relationship obtained by the measurement is graphically shown in FIG. 5 from which it is clear that a phenomenon of hysteresis was noted in the current vs. voltage curve and the resistance of the membrane was variable depending on the current only when the surface of the membrane positive to the other surface was the surface which was in contact with the glass surface in the preparation of the film by casting of a solution on a glass plate. It was noted that, when the pH of the electrolyte solution was further decreased to a value substantially lower than 4, the phenomenon of hysteresis in the voltage vs. curve disappeared irrespective of the direction of the voltage impression.

What is claimed is:

1. A non-linear resistor which comprises, as a functional element, a polymeric membrane formed of a poly(amino acid) having ionic groups as the pendants to the main chain of the molecule and insoluble in water as a whole.

2. A non-linear resistor as claimed in claim 1 wherein the ionic group is a carboxyl group or an amino group.

3. A non-linear resistor as claimed in claim 1 wherein the poly(amino acid) is composed of a first moiety of a first amino acid which gives a water-soluble poly(amino acid) and a second moiety of a second amino acid which gives a water-insoluble poly(amino acid).

4. A non-linear resistor as claimed in claim 3 wherein the poly(amino acid) is composed of from 5 to 45% by moles of the first moiety of a first amino acid and from 95 to 55% by moles of the second moiety of a second amino acid.

5. A non-linear resistor as claimed in claim 3 wherein the first amino acid is selected from the group consisting of glutamic acid, aspartic acid, lysine and ornithine.

6. A non-linear resistor as claimed in claim 3 wherein the second amino acid is selected from the group consisting of leucine, alanine and methionine.

7. A non-linear resistor which comprises:
(a) a polymeric membrane formed of a poly(amino acid) having ionic groups as the pendants to the main chain of the molecule and insoluble in water as a whole;
(b) two electrolyte-containing media each contacting with one of the surfaces of the polymeric membrane; and
(c) at least two electrodes each in contact with one of the electrolyte-containing media.

8. The non-linear resistor as claimed in claim 7 wherein the polymeric membrane has a thickness in the range from 1 to 100 $\mu$m.

9. The non-linear resistor as claimed in claim 7 wherein the electrolyte-containing medium is an aqueous solution of a salt selected from the group consisting of lithium chloride, sodium chloride, potassium chloride, calcium chloride and sodium acetate.

10. The non-linear resistor as claimed in claim 9 wherein the concentration of the aqueous solution of the salt is in the range from $10^{-4}$ to $10^{-1}$ mole/liter.

11. The non-linear resistor as claimed in claim 7 wherein the electrode is an Ag/AgCl electrode or a caromel electrode.